US00RE48777E

(19) United States
(12) Reissued Patent
Rathnam

(10) Patent Number: US RE48,777 E
(45) Date of Reissued Patent: Oct. 19, 2021

(54) POOL

(71) Applicant: Modpro Containers Limited, Abbotsford (CA)

(72) Inventor: Paul J. Rathnam, Abbotsford (CA)

(73) Assignee: MODPRO CONTAINERS LIMITED

(21) Appl. No.: 29/740,364

(22) Filed: Jul. 2, 2020

Related U.S. Patent Documents

Reissue of:
(64) Patent No.: Des. 822,226
Issued: Jul. 3, 2018
Appl. No.: 29/562,384
Filed: Apr. 25, 2016

(51) LOC (13) Cl. ..... 25-03
(52) U.S. Cl.
USPC ..... D25/2
(58) Field of Classification Search
USPC ..... D23/276, 277, 280.1, 316; D24/203, D24/204, 205, 206; D25/2
CPC ..... E04H 4/0018; E04H 4/0012; E04H 4/00; E04H 4/0087; E04H 4/0093; E04H 4/005; E04H 4/0031; E04H 4/0062; E04H 4/0037; E04H 4/0043
See application file for complete search history.

(56) References Cited

U.S. PATENT DOCUMENTS 2,898,607 A 8/1959 McGurie
RE25,078 E 11/1961 McGuire
3,460,166 A 8/1969 Weber
3,501,783 A 3/1970 Broadman
D241,643 S * 9/1976 Bonsack ..... D23/280.1
4,001,899 A 1/1977 Mathis
D246,728 S 12/1977 Wormser
D251,201 S * 2/1979 Mathis ..... 4/488
4,227,266 A * 10/1980 Russell ..... E04H 4/12 137/362
D266,697 S * 10/1982 Topete ..... D23/277
D266,789 S * 11/1982 Topete ..... D23/277
D269,813 S * 7/1983 Topete ..... D23/280.1
4,411,031 A 10/1983 Stolar
D271,522 S 11/1983 Wiley
D271,955 S 12/1983 Neil
D271,995 S 12/1983 Topete
4,459,711 A 7/1984 Sartain et al.
4,494,256 A 1/1985 Radtke et al.
D300,360 S 3/1989 Jacuzzi
4,815,152 A 3/1989 MacDonald et al.
4,930,168 A 6/1990 Ferlise
D321,923 S 11/1991 Ross
D324,729 S 3/1992 Yvetot
D346,728 S 5/1994 Lawson
5,640,352 A 6/1997 Honda
D388,880 S 1/1998 DeFilippo
D417,286 S 11/1999 Sullivan
6,014,778 A 1/2000 Varnados
6,519,788 B1 2/2003 Epple
6,526,604 B1 3/2003 Mathis
6,640,352 B2 11/2003 Huang
6,939,366 B2 9/2005 Brown, Jr.
D510,630 S 10/2005 Sullivan
7,070,096 B2 7/2006 Muller et al.
D608,902 S 1/2010 Gill
D617,466 S 6/2010 Edgar
D645,162 S 9/2011 Martell
D660,442 S 5/2012 Sullivan
D685,500 S 7/2013 Sullivan
D695,909 S 12/2013 Martell
D697,635 S 1/2014 Paxton
D703,795 S 4/2014 Licini
RE45,820 E 12/2015 Jiang
D748,868 S 2/2016 Kilroy
D782,631 S 3/2017 Schachter
D794,824 S 8/2017 Pain
9,932,092 B1 4/2018 Garruto
D822,226 S 7/2018 Rathnam
D835,294 S 12/2018 Rathnam
D864,402 S 10/2019 Rathnam
D864,416 S 10/2019 Rathnam
D870,918 S 12/2019 Rathnam
2005/0150175 A1 7/2005 Guigan
2006/0107454 A1 5/2006 Spicer
2009/0025134 A1 1/2009 Stephens
2010/0021609 A1 1/2010 Mattson et al.
2010/0095448 A1 4/2010 Goldmann
2010/0122407 A1 5/2010 Dewyea et al.
2010/0170032 A1 7/2010 Sproatt et al.
2010/0187146 A1 7/2010 Kochanowski
2010/0199417 A1 8/2010 Shebek
2010/0281609 A1 11/2010 Holmgren
2011/0240497 A1 10/2011 Dechene
2011/0299935 A1 12/2011 Dornberg

AMENDED

| | | | |
|---|---|---|---|
| 2012/0175578 | A1 | 7/2012 | Boudreau |
| 2013/0068763 | A1 | 3/2013 | Kochanowski |
| 2013/0245183 | A1 | 9/2013 | Beaudry |
| 2013/0247351 | A1 | 9/2013 | Stutson, Jr. |
| 2014/0283452 | A1 | 9/2014 | Dittman |
| 2015/0089732 | A1 | 4/2015 | Khamis |
| 2015/0240509 | A1 | 8/2015 | Ferriss |
| 2015/0266666 | A1 | 9/2015 | Wong |
| 2016/0083176 | A1 | 3/2016 | Kraft |
| 2016/0102470 | A1 | 4/2016 | Brooks |
| 2016/0130828 | A1 | 5/2016 | Moody |
| 2016/0288993 | A1 | 10/2016 | Hu |
| 2016/0298348 | A1 | 10/2016 | Lisk |
| 2016/0311613 | A1 | 10/2016 | Churbuck |
| 2016/0318069 | A1 | 11/2016 | McIlwraith et al. |
| 2016/0318609 | A1 | 11/2016 | Lynn |
| 2017/0198486 | A1 | 7/2017 | Stone |
| 2018/0148945 | A1 | 5/2018 | Roux |
| 2018/0187440 | A1 | 7/2018 | Vervoort |
| 2018/0195302 | A1 | 7/2018 | Woods |
| 2019/0063093 | A1 | 2/2019 | Coenraets |

FOREIGN PATENT DOCUMENTS

| | | | |
|---|---|---|---|
| CA | 30075 | | 12/1967 |
| CA | 30519 | | 4/1968 |
| CA | 30765 | | 8/1968 |
| CA | 30766 | | 8/1968 |
| CA | 39071 | | 4/1975 |
| CA | 50641 | | 12/1982 |
| CA | 65069 | | 1/1990 |
| CA | 66670 | | 8/1990 |
| CA | 74454 | | 7/1994 |
| CA | 81748 | | 9/1997 |
| DE | 2235721 | A1 | 1/1974 |
| DE | 2742801 | A1 | 4/1979 |
| DE | 202006017784 | U1 | 2/2007 |
| DE | 102009033144 | A1 | 2/2010 |
| DE | 102010032727 | A1 | 1/2012 |
| DE | 102010032730 | A1 | 1/2012 |
| DE | 102011078799 | A1 | 2/2012 |
| DE | 202013003755 | U1 | 5/2013 |
| DE | 102010032727 | B4 | 4/2017 |
| EP | 1588988 | A1 | 10/2005 |
| EP | 2230213 | B1 | 9/2010 |
| TW | 200833237 | A1 | 8/2008 |
| WO | 9748647 | | 12/1997 |

OTHER PUBLICATIONS

Tiger Containers, Shipping Container Pools: 5 Quick Considerations, URL: https://www.tigercontainers.com/blog/shipping-container-pools-5-quick-considerations/ (Accessed Nov. 1, 2019).

Tamara, "Swimming pool out of storage container", URL: http://www.portamini.com/swimming-pool-storage-container/ Published Mar. 27, 2016).

EES Shipping Pty Ltd, "Shipping container pools", URL: https://eescair.com/?p=3453 (Published Feb. 13, 2015).

EES Shipping Pty Ltd, "Robust container pools", URL: https://eescair.com/?p=5927 (Published Jan. 11, 2016).

Adaptainer, "Extraordinary shipping container swimming pools", URL: https://adaptainer.co.uk/container-conversion/shipping-container-swimming-pools-for-sale-price/ (Published Oct. 11, 2015).

R. Herr, "How to Build a Shipping Container Pool", URL: https://containerauction.com/read-news/how-to-build-a-shipping-container-pool (Published Nov. 26, 2014).

Premierbox, "Shipping Container Swimming Pools", URL: https://premierbox.wordpress.com/2014/03/31/shipping-container-swimming-pools/ (Published Mar. 31, 2014).

Shippingcontainerhomes, "Shipping Container Swimming Pools Book 1", URL: https://issuu.com/shippingcontainerhomes/docs/shipping-container-swimming-pools-1 (Published Jul. 24, 2015).

Tuomas P., "Shipping Containers And Other Amazing Swimming Pools"; "Shipping Container Swimming Pools!", URL: https://shanghaimetalcorporation.wordpress.com/tag/shipping-container-swimming-pools/ (Published Sep. 1, 2014).

Ein Produkt der Nagel-Gruppe, "Containerpool", URL: https://web.archive.org/web/20111130135650/http:/www.nagel-containerpool.de:80/ (Published Nov. 30, 2011).

L. Alter, "SOAK in a shipping container spa in San Francisco", URL: https://www.treehugger.com/modular-design/soak-shipping-container-spa-san-francisco.html (Published Dec. 13, 2013).

B. Meinhold, "SOAK Pop-Up Shipping Container Spa Promotes Health & Sustainability in San Francisco", URL: https://inhabitat.com/soak-pop-up-shipping-container-spa-promotes-health-sustainability-in-san-francisco/ (Published Jul. 22, 2013).

A. Schwartz, "This Anti-Spa Is Built Inside Shipping Container", URL: https://www.fastcompany.com/3023600/this-anti-spa-is-built-inside-shipping-containers (Published Dec. 19, 2013).

B. Tsui, "Designing a Day Spa That Isnt' Terrible for the Environment", URL: https://www.citylab.com/design/2013/12/designing-day-spa-isnt-terrible-environment/7849/ (Published Dec. 12, 2013).

N. Waters, "SOAK: An Ecological Urban Bathhouse: Prototyping an eco-spa one shipping container at a time", URL: https://www.kickstarter.com/projects/1390256402/soak-an-ecological-urban-bathhouse (Accessed Nov. 1, 2019).

The epic, "i just went swimming. in a shipping container.", URL: https://theepic.wordpress.com/2008/07/28/i-just-went-swimming-in-a-shipping-container/ (Published Jul. 28, 2008).

The epic, "shipping container pool: 7 years out", URL: https://theepic.wordpress.com/2015/07/25/shipping-container-pool-7-years-out/ (Published Jul. 25, 2015).

Budget Dumpster Rental, "Dumpster Discoveries: The Dumpster Pool", URL: https://www.youtube.com/watch?v=DLpmU-OkU1k&feature=youtu.be (Published Jan. 6, 2016).

Dailymail, "Refreshing change: Experimental architect Stefan Beese has brought 'dumpster diving' to his own backyard by converting a 22-foot-long, steel refuse container into a small, but elegant, swimming pool", URL: https://www.dailymail.co.uk/news/article_-3167495/You-ve-just-got-dive-Architect-turns-dumpster-swimming-pool-family.html (Accessed prior to Oct. 23, 2019).

Coverstar, Installation Guide, Sep. 1, 2016, https://www.coverstarcentral.com/pdf/Encapsulation_Kit_Installation_Guid_L9786.pdf (Year: 2016).

Hilfiger Denim, Bread & Butter, Berlin, Summer 2011, http://www.twotimestwentyfeet.com/en/container-projects/hilfiger-denim-bread-butter-berlin-summer-2011/#prettyPhoto, Artdepartment Berlin GmbH (accessed Jun. 17, 2020).

Berlin high plan view photo, of Hilfiger Denim at Bread & Butter, Berlin, summer 2011, author unknown.

Design U.S. Appl. No. 29/691,999, filed May 21, 2019.

Porta-Mini Storage, "Shipping Pool Out of Storage Container". http://www.portamini.com/swimming-pool-storage-container/. May 18, 2016.

EES Shipping PTY Ltd., "Shipping Container Pools". https://eescair.com/?p=3453. Nov. 28, 2016.

EES Shipping PTY Ltd., "Robust Container Pools". https://eescair.com/?p=5927. Feb. 22, 2016.

Adaptainer Limited, "Extraordinary Shipping Container Swimming Pools". https://adaptainer.co.uk/container-conversion/shipping-container-swimming-pools-for-sale-price/. Oct. 13, 2015.

Ryan Herr, "How to Build a Shipping Container Pool". Containerauction.com, https://containerauction.com/read-news/how-to-build-a-shipping-container-pool. Mar. 25, 2015.

Premierbox, "Shipping Container Swimming Pools". https://premierbox.wordpress.com/2014/03/31/shipping-container-swimming-pools/. Jun. 5, 2017.

Dailymail.com, "Architect Stefan Beese turns dumpster into swimming pool for his family". http://www.dailymail.co.uk/news/article-3167495/You-ve-just-got-dive-Architect-turns-dumpster-swimming-pool-family.html. Jul. 20, 2015.

Doug MacCash, "Experimental Architect Stefan Beese Converts a Steel Refuse Container into a Backyard Pool". NOLA.com. Sep. 21, 2012.

Shanghai Metal Corporation, "Shipping Container and Other Amazing Swimming Pools". Wordpress.com. Oct. 8, 2014.

Ariel Schwartz, "This Anti-Spa Is Built Inside Shipping Containers". Fast Company. http://www.fastcoexist.com/3023600/this-anti-spa-is-built-inside-shipping-containers. Dec. 25, 2013.
Bonnie Tsui, "Designing a Day Spa That Isn't Terrible for the Environment". City Lab. https://www.citylab.com/design/2013/12/designing-day-spa-isnt-terrible-environment/7849/. Oct. 12, 2014.
Nell Waters, "SOAK An Ecological Urban Bathhouse". Kickstarter, PBC. Mar. 28, 2017.
Nell Waters, "SOAK: An Ecological Urban Bathhouse". Kickstarter. http://www.kickstarter.com/projects/1390256402/soak-an-ecological-urban-bathhouse. Nov. 26, 2013.
Theepic, "I just went swimming. in a shipping container". Wordpress.com. https://theepic.wordpress.com/2008/07/28/i-just-went-swimming-in-a-shipping-container/. Aug. 9, 2009.
Theepic, "Shipping container pool: 7 years out". Wordpress.com. https://theepic.wordpress.com/2015/07/25/shipping-container-pool-7-years-out/. Mar. 5, 2017.
Associated Press, "Raw Video—Dumpsters Transformed Into Pools". Youtube.com. Aug. 3, 2010.
Pictures of New York City. Aug. 9, 2013.
Shippingcontainerhomes, "Shipping Container Homes Swimming Pools Presentation 2". Issuu.com. Jul. 30, 2015.
Screenshots of Dunk Pool Configuration Summary. Apr. 19, 2017.
Screenshots of The Palladium Plunge on Leisure Pool's Webpage. Undated. Available at least as early as Jan. 20, 2021.
TwoTimesTwentyFeet.com, "Hilfiger Denim, Bread & Butter, Berlin, Summer 2011/2010". Jun. 30, 2017.
William Porter, "Denver Taxi Development's container pool earns repurposing props". The Denver Post. Jul. 20, 2012.
William Porter, "Denver Taxi Development's container pool earns repurposing props". The Denver Post. Jul. 11, 2016.
Timothy Hoelzle, "Shipping Containers Upcycled". GreatEcology.com. Aug. 8, 2012.
Yuka Yoneda, "Photos: Colorful New Pop-Up Pool and Beach Open at Brooklyn Bridge Park". InHabitat.com. Jul. 6, 2012.
Coverstar Inc. Installation Guide. Sep. 1, 2006.
Bonnie Tsui, "Designing a Day Spa That Isn't Terrible for the Environment". Bloomberg.com. Dec. 12, 2013.
2×20FT, "Hilfiger Denim, Bread & Butter, Berlin, Summer 2011/2010" TwoTimesTwentyFeet.com. Jun. 30, 2017.

* cited by examiner

*Primary Examiner* — Philip S Hyder

(74) *Attorney, Agent, or Firm* — Oyen Wiggs Green & Mutala LLP

(57) CLAIM

The ornamental design for a pool, as shown and described.

DESCRIPTION

*This application is a reissue application of U.S. Pat. No. D. 822,226 issued Jul. 3, 2018, the entirety of which is incorporated herein by reference.*

FIG. 1 is a perspective view of a first embodiment of a pool showing the design;

*FIG. 10 is an enlarged detail view of the area encircled in FIG. 1.*

Figure 2:
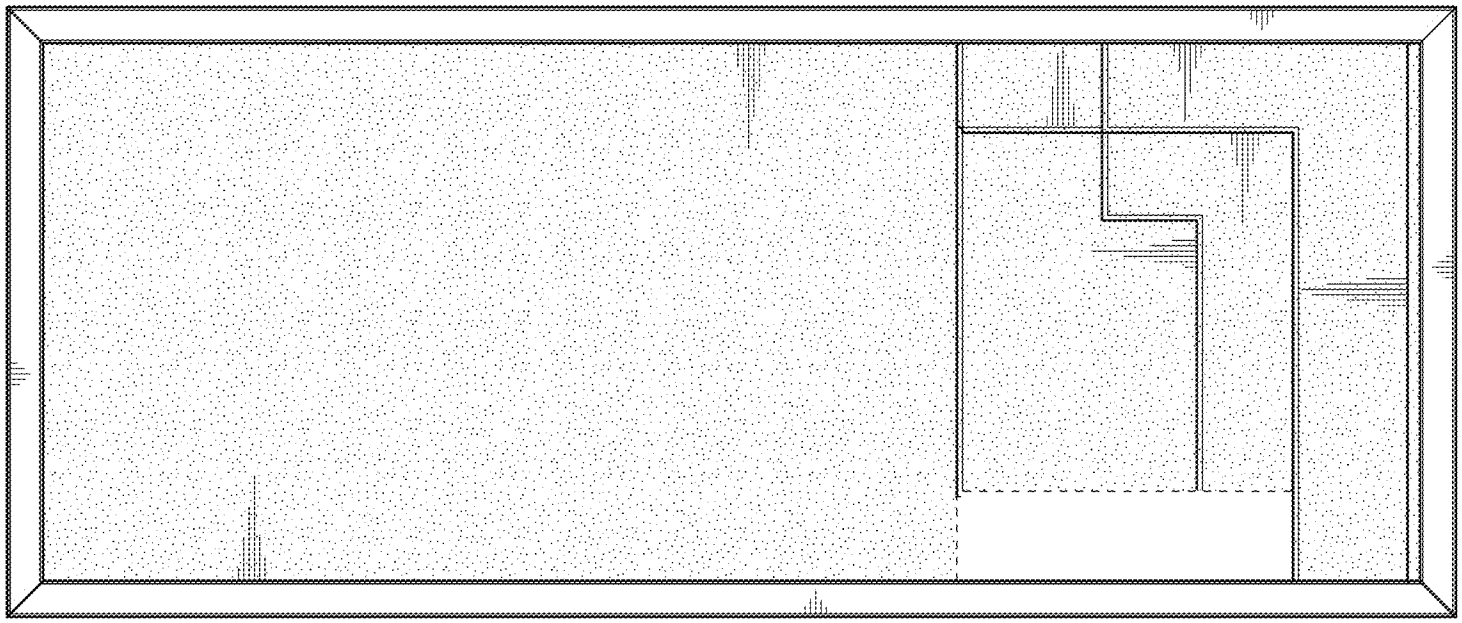
FIG. 2 is a top view of the embodiment shown in FIG. 1.
Figure 3:
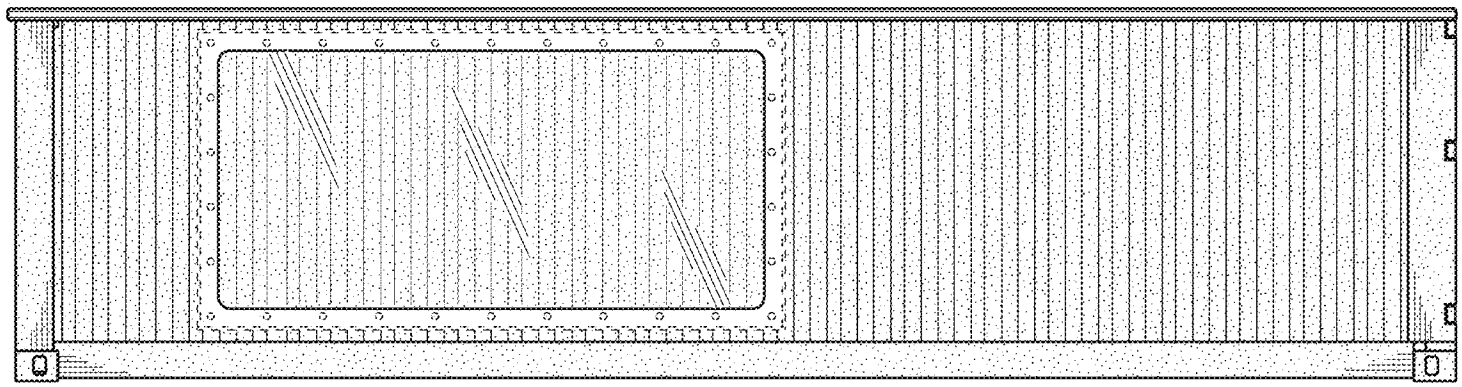
FIG. 3 is a front view of the embodiment shown in FIG. 1.
Figure 4:
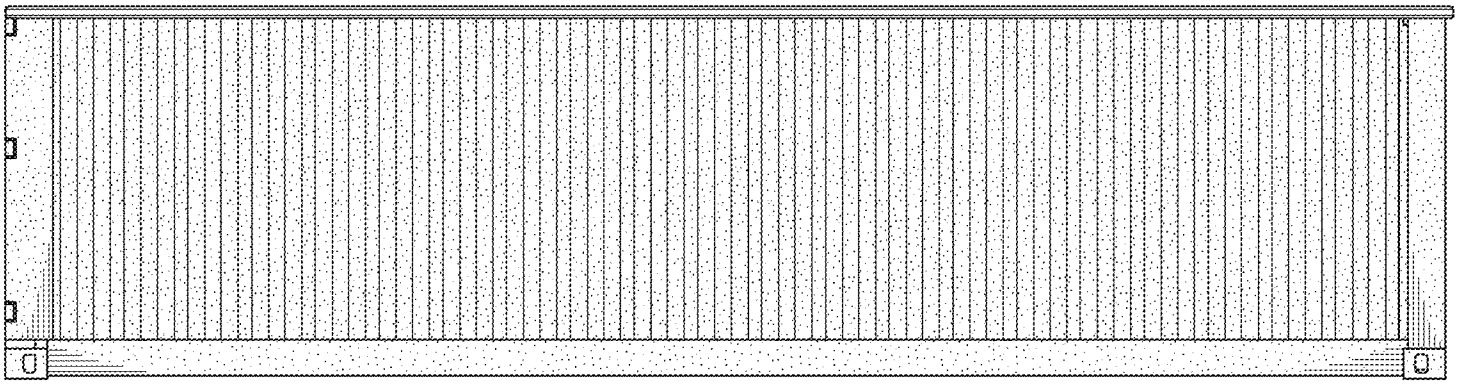
FIG. 4 is a rear view of the embodiment shown in FIG. 1.
Figure 5:
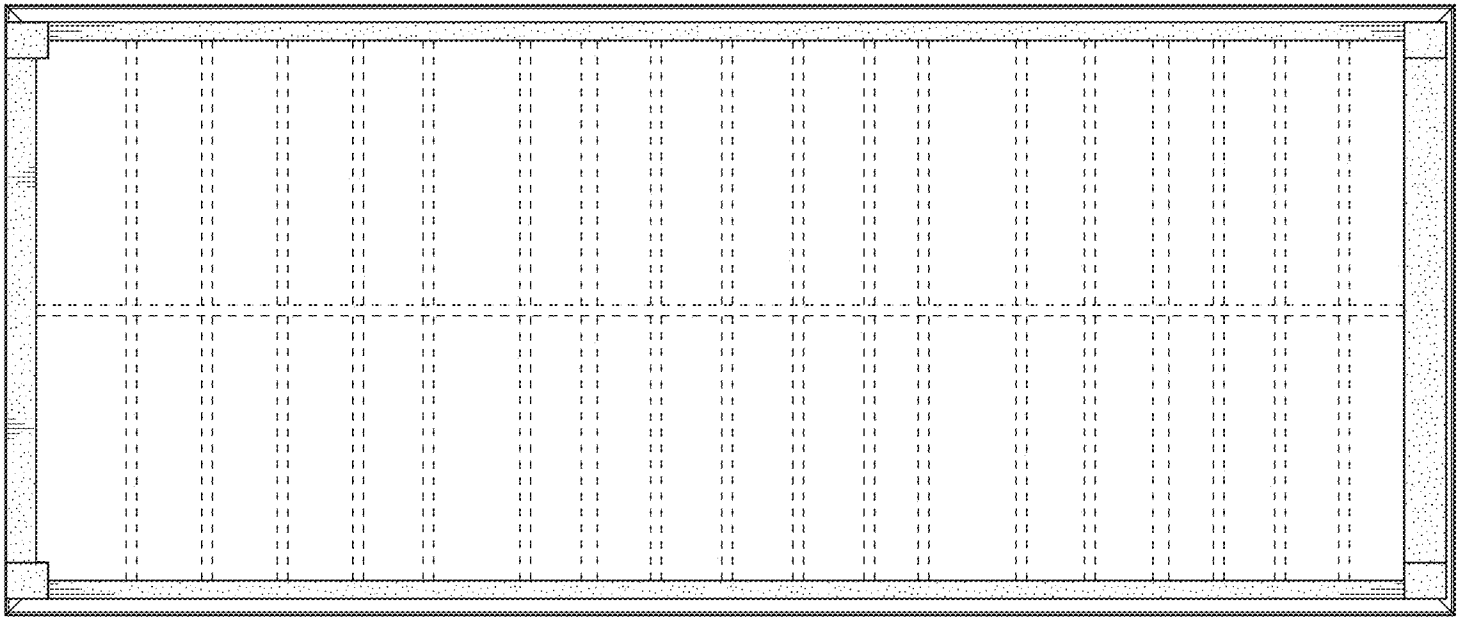
FIG. 5 is a bottom view of the embodiment shown in FIG. 1.
Figure 6:
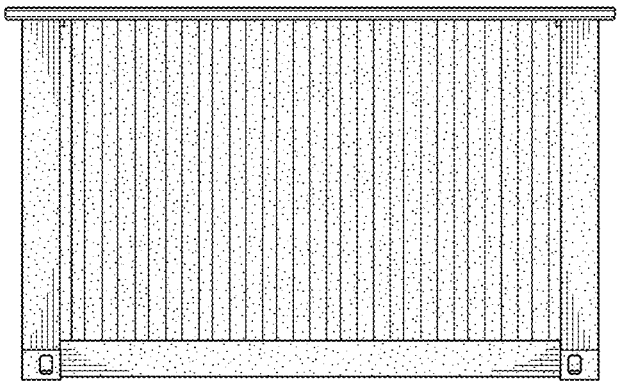
FIG. 6 is a left end view of the embodiment shown in FIG. 1.
Figure 7:
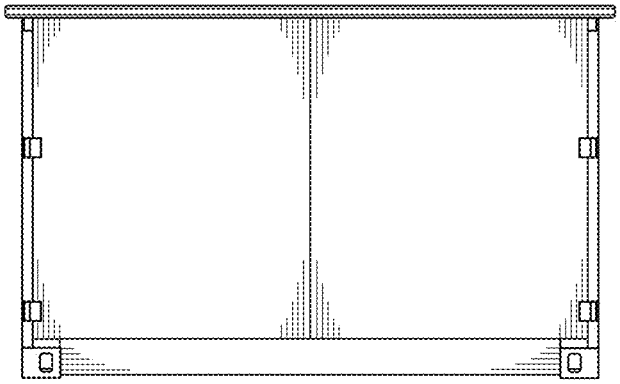
FIG. 7 is a right end view of the embodiment shown in FIG. 1.
Figure 8:
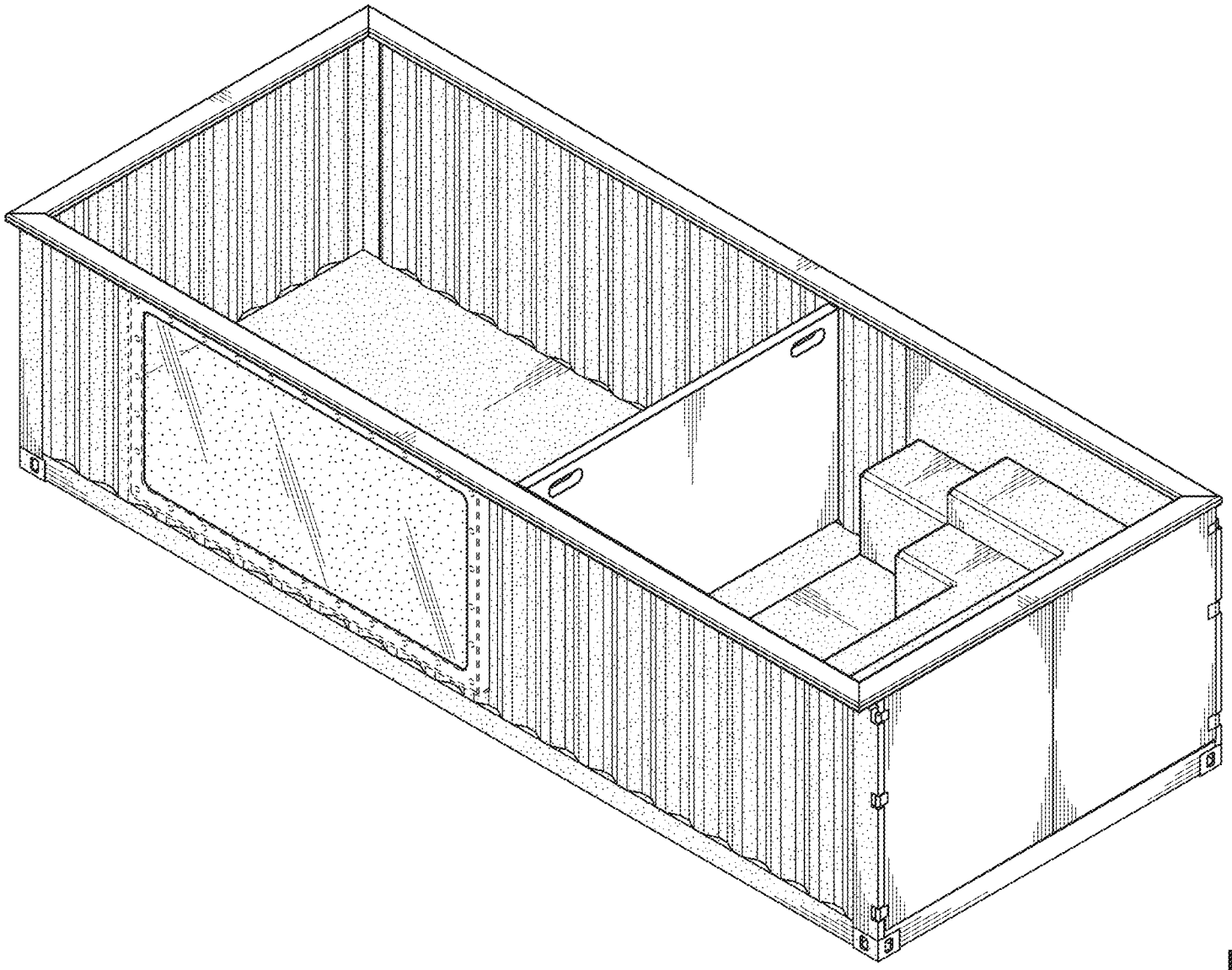
FIG. 8 is a perspective view of a second embodiment of a pool showing the design, the second embodiment being generally the same as the first embodiment but having a removable divider; [and,]
Figure 9:
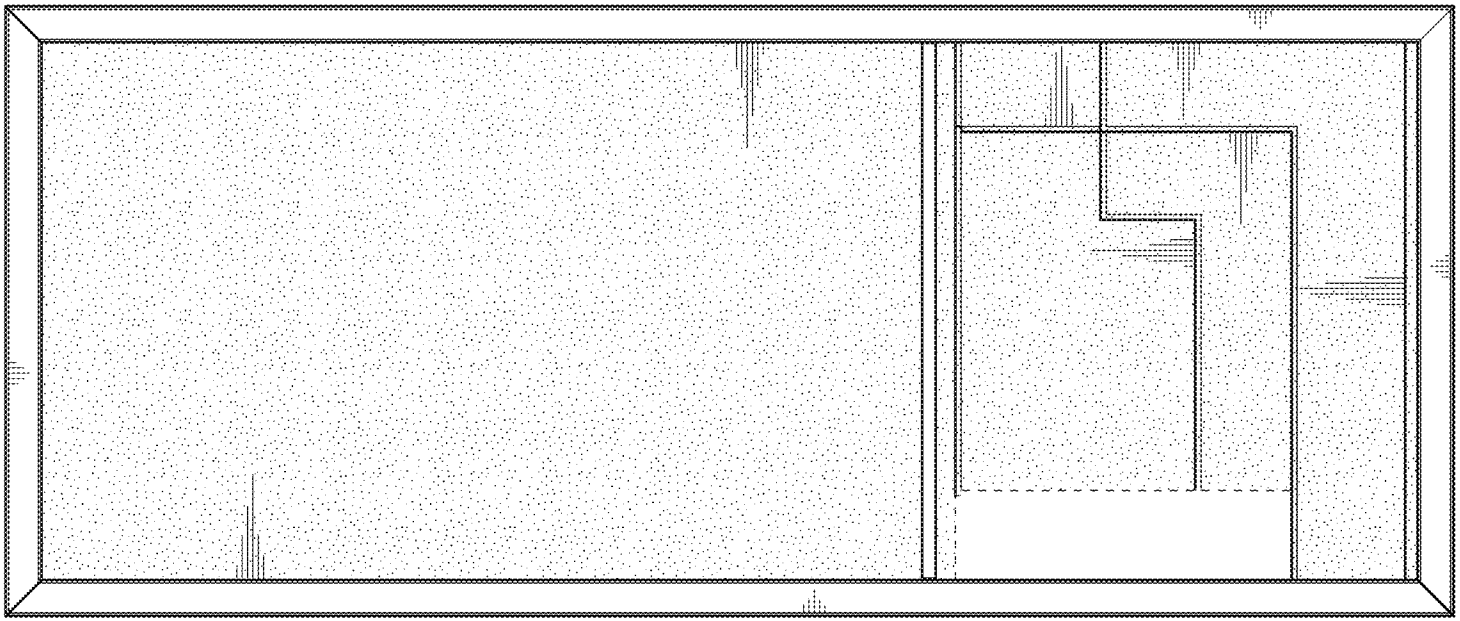
FIG. 9 is a top view of the embodiment shown in FIG. 8[.]*; and*

The [subject matter] *frame and bolts* shown in broken lines [forms] *form* no part of the claimed design. *The window shown in solid outline does form part of the claimed design.*The stippled surfaces indicate surface treatment, namely a sprayfoam coating that is applied to the metal of the shipping container from which the pool is made.

1 Claim, 6 Drawing Sheets

Matter enclosed in heavy brackets [ ] appears in the original patent but forms no part of this reissue; matter printed in italics indicates the additions made by reissue.

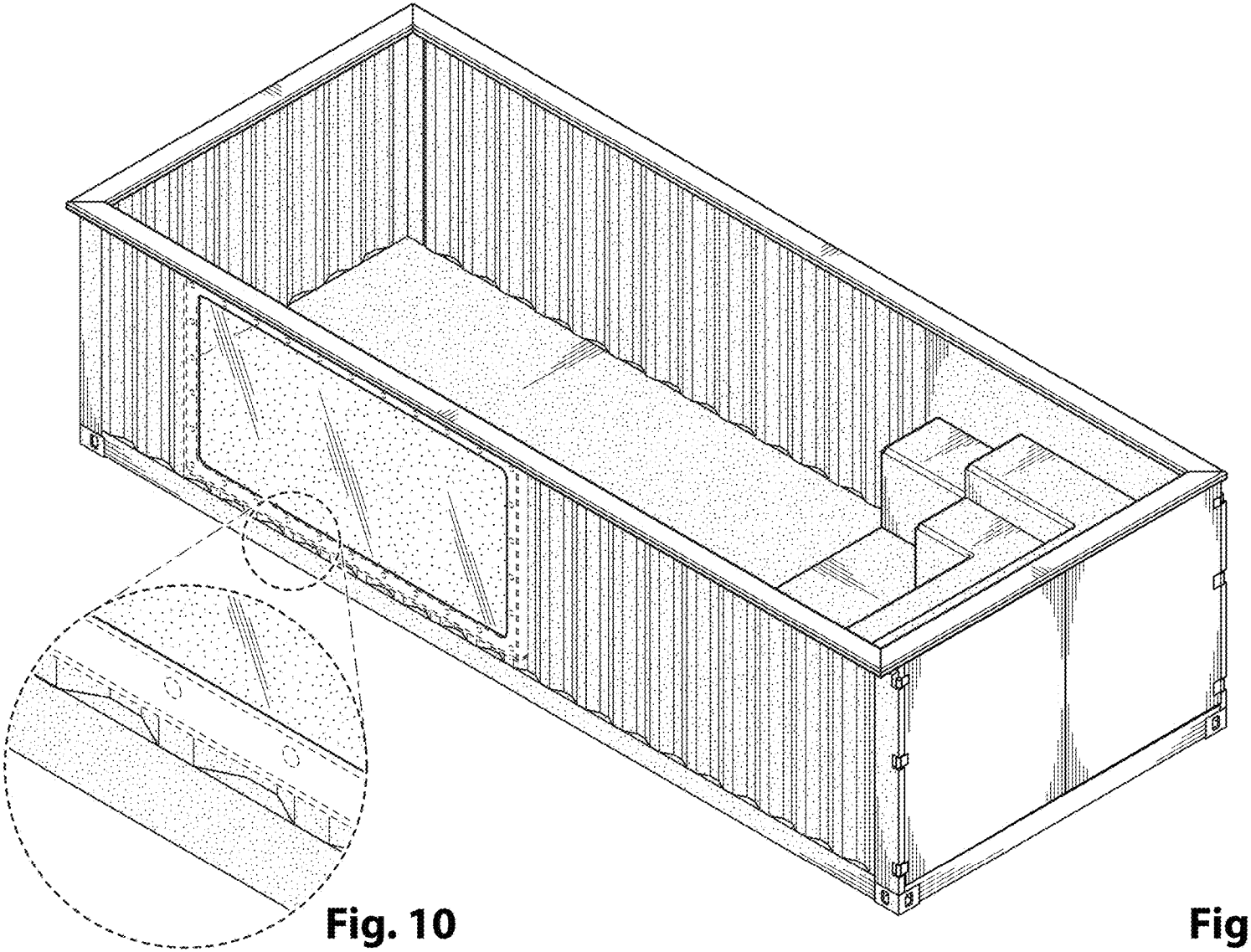
Fig. 1
AMENDED
Fig. 10
NEW